Jan. 15, 1929.
H. SYNCK
1,698,896
MANURE SPREADER
Original Filed March 14, 1924
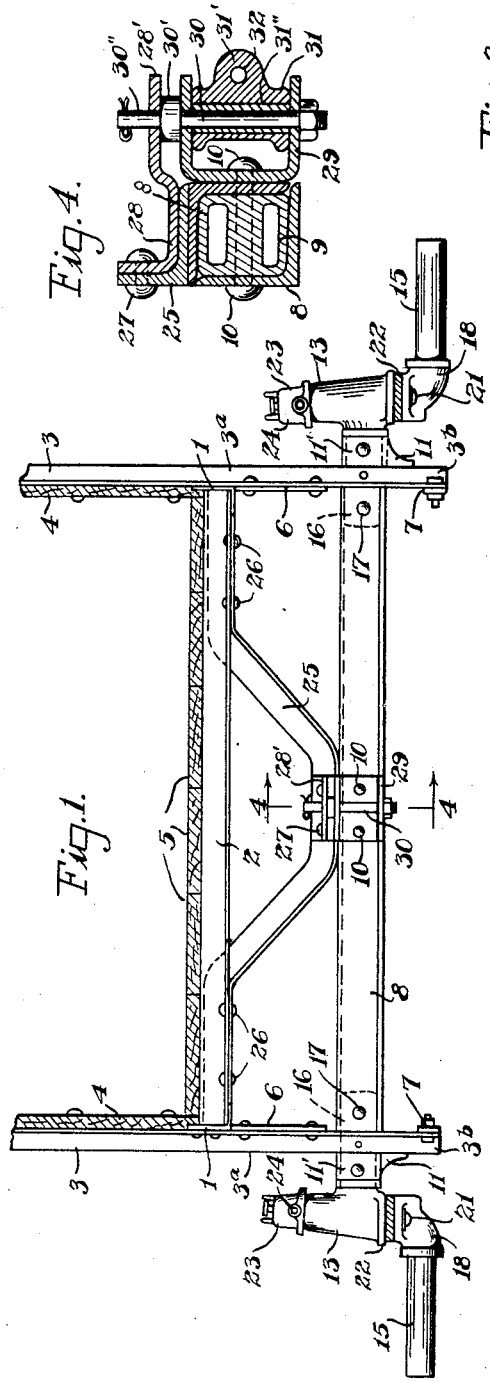
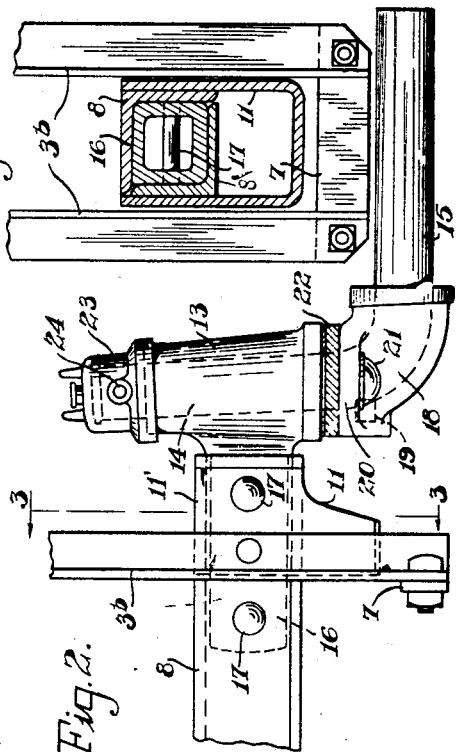
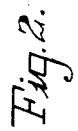
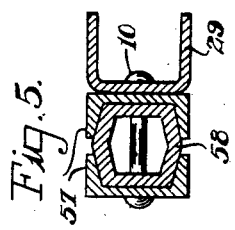
INVENTOR.
Henry Synck
BY
ATTORNEYS.

Patented Jan. 15, 1929.

1,698,896

UNITED STATES PATENT OFFICE.

HENRY SYNCK, OF COLDWATER, OHIO, ASSIGNOR TO THE NEW IDEA SPREADER COMPANY, OF COLDWATER, OHIO, A CORPORATION OF OHIO.

MANURE SPREADER.

Original application filed March 14, 1924, Serial No. 699,385. Divided and this application filed March 14, 1927. Serial No. 175,019.

This invention relates to improvements in manure spreaders, it particularly relating to the axle and wheel spindle construction; the application being a division of my pending application Serial No. 699,385, filed March 14, 1924.

The object of the invention is to provide an axle and wheel spindle arrangement which will be simple and strong in construction, and economical in manufacture.

Further objects of the invention will be apparent from the accompanying description, drawings and claims.

In the accompanying drawings:

Fig. 1 is a front elevation.

Fig. 2 is a front elevation of a portion of the device on an enlarged scale.

Fig. 3 is a section on the line 3—3 of Fig. 2.

Fig. 4 is a section on the line 4—4 of Fig. 1.

Fig. 5 is a section showing a modification of the axle construction.

The bed of the vehicle is shown in Fig. 1 and consists of longitudinally extending elements in the form of L-beams 1, connected by angle iron cross-members 2 and having secured to the outer side of the vertical webs thereof uprights 3 of angle iron to which are connected wooden sides 4. The boards 5 forming the bottom of the bed are laid upon the cross-members 2 and secured thereto in any suitable way. The two end members 3 on each side of the bed project below the side walls and beams, their lower ends bent toward each other and thence projected downwardly in parallel relation as indicated at 3$^b$, so as to form guides for the axle. For the purpose of stiffening these guide members the intermediate portions 3$^a$ are connected together by a plate 6 and the lower ends of the portions 3$^b$ are connected by bars 7.

The front axle is formed of two angle iron members 8, the edges of the horizontal and vertical portions being placed together so as to form a hollow structure which has a central filler member 9, this filler member and the two angle irons 8 being connected together by a pair of rivets 10 as shown in Figs. 1 and 4. Each of the ends of the axle projects through the corresponding guides 3$^b$ and secured to each end of the axle is a U-shaped plate 11, the vertical sides of which embrace the sides of the axle members so as to cooperate with the guide members 3$^b$ to guide the axle. The sides of each U-shaped plate at the points where they embrace the axle are extended, as indicated at 11', and are secured to the axle member by one of the rivets 17 hereinafter referred to.

Each of the sleeve bearings 13 for the vertical portion 14 of the wheel spindle 15 has an integrally formed hollow shank 16, substantially square in cross section which is placed in the adjacent end of the axle and rigidly connected therewith by the rivets 17 which pass through the vertical webs of the two axle members 8 so as to further stiffen the axle and provide for rigidly securing the bearing sleeve thereto. A sleeve 18 at the juncture of the vertical and horizontal portion of each spindle is keyed to the spindle by a pin shown in dotted lines at 19 in Fig. 2, and this sleeve has oppositely projecting ears, one of which is shown, to which the steering arms 22 are secured by the rivets 21. The upper end of the bearing sleeve is closed by cap 23 which is secured to the upper end of the spindle, so as to turn therewith, by the pin 24, the cap being provided with means in the usual way for the insertion of lubricant. The sleeve 18 not only acts for means of attachment for the steering arm, but also serves to support the bearing sleeve 13 and the weight of the vehicle imposed thereon through the axle.

A substantially U-shaped bolster 25 of angle iron is riveted to one of the angle iron members 2 by the rivets 26 and has its central portion resting upon the upper surface of the central portion of the axle. Secured to the vertical web of the bolster by rivets 27 is a vertical web of a plate 28, the horizontal portion of which projects forwardly and is offset upwardly as indicated at 28'. Secured to the forward side of the axle by rivets 10 is a U-shaped member 29, the horizontal webs of which receive a pivot bolt 30, the head 30' of which is disposed between the upper horizontal portion of the member 29 and the offset 28'; the bolt having an extension 30'' extending loosely through an aperture in the part 28', thus holding the bolster against endwise movement on the axle and also holding the bolster in alignment with the axle. Pivoted on the bolt 30 is a sleeve 31 provided with a renewable bushing 31'' which acts as a spacer. The sleeve 31' has on its forward side an integrally formed transversely extending boss 31' provided with a transversely arranged opening 32 to receive a bolt (not shown) which serves to pivotally connect draft members with said sleeve.

In Fig. 5 there is shown a modification in the axle construction in which two channels 57 are employed instead of angle irons 8. The filler member indicated at 58 is also somewhat modified to conform to the shape of the axle member.

Having thus described my invention, I claim:

1. In a structure of the character described, an axle constructed of two members each formed with at least one right angle, said members being placed together to form a hollow axle structure, a bearing for a wheel spindle at each end of said axle and formed as a separate element therefrom, an integral shank formed on each bearing and extended into the corresponding end of said axle with the exterior thereof corresponding to the interior form of said axle, guide members embracing each end of said axle, and common means for securing said axle, shank and guide members together.

2. In a structure of the character described, an axle constructed of two members each formed with at least one right angle, said members being placed together to form a hollow axle structure, a bearing for a wheel spindle at each end of said axle and formed as a separate element therefrom, an integral shank formed on each bearing and extended into the corresponding end of said axle with the exterior thereof corresponding to the interior form of said axle, guide members embracing each end of said axle, common means for securing said axle, shank and guide members together, and vertical guides projecting from the bed of the vehicle and co-operating with said guide members.

3. In a structure of the character described, an axle, a substantially U-shaped bolster supported upon the central portion of the upper surface of said axle, a U-shaped member connected with said axle, a vertical pivot pin carried by said U-shaped member, a sleeve journaled upon said pin between the horizontal webs of said U-shaped member to form means for attaching draft appliances, and a plate rigidly secured to said bolster and having an aperture through which said pin loosely extends.

In testimony whereof, I have hereunto set my hand this 3rd day of March, 1927.

HENRY SYNCK.